US012359771B2

(12) United States Patent
Wang

(10) Patent No.: US 12,359,771 B2
(45) **Date of Patent: *Jul. 15, 2025**

(54) PRESSURE TANK

(71) Applicant: Li-Ming Wang, Taichung (TW)

(72) Inventor: Li-Ming Wang, Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/516,123

(22) Filed: Jul. 18, 2019

(65) Prior Publication Data

US 2019/0390820 A1 Dec. 26, 2019

Related U.S. Application Data

(63) Continuation of application No. 14/984,269, filed on Dec. 30, 2015, now abandoned, which is a (Continued)

(51) Int. Cl.
*F17C 1/00* (2006.01)

(52) U.S. Cl.
CPC ........ *F17C 1/00* (2013.01); *F17C 2201/0104* (2013.01); *F17C 2201/0109* (2013.01); *F17C 2201/0185* (2013.01); *F17C 2203/0604* (2013.01); *F17C 2203/0619* (2013.01); *F17C 2203/0636* (2013.01); *F17C 2203/0643* (2013.01); *F17C 2203/066* (2013.01); *F17C 2203/0685* (2013.01); *F17C 2205/0305* (2013.01); *F17C 2205/0335* (2013.01); *F17C 2205/0382* (2013.01); *F17C 2205/0397* (2013.01); *F17C 2209/221* (2013.01); *F17C 2209/228* (2013.01); *F17C 2209/232* (2013.01);

(Continued)

(58) Field of Classification Search
CPC ...... F17C 1/00; F17C 5/10; F17C 5/02; F17C 5/00
See application file for complete search history.

(56) References Cited

U.S. PATENT DOCUMENTS

| | | | |
|---|---|---|---|
| 1,320,259 | A | 10/1919 | Martens |
| 1,370,123 | A | 3/1921 | Knox |

(Continued)

FOREIGN PATENT DOCUMENTS

| | | |
|---|---|---|
| TW | M250911 | 11/2004 |
| TW | M312357 | 5/2007 |

*Primary Examiner* — Anthony D Stashick
*Assistant Examiner* — Blaine G Neway
(74) *Attorney, Agent, or Firm* — MUNCY, GEISSLER, OLDS & LOWE, P.C.

(57) ABSTRACT

A pressure tank includes a metallic vessel, a plastic liner received in the metallic vessel, a flexible diaphragm, two connectors and a nozzle coupled to the nipples respectively. The metallic vessel includes upper and lower shells. The upper shell defines a first planar area on a side thereof and a second planar area on a top thereof. The lower shell defines a third planar area thereunder. The flexible diaphragm divides the metallic vessel into a storage space and a pneumatic room. Each of the connectors includes a nipple and an anti-leak assembly. The nipples of the connectors are mounted on the side and top of the upper shell respectively and are in communication with the storage space. The two anti-leak assemblies provide leakproof connection between the nipples and the plastic liner. Additionally, the nozzle is mounted on the third planar area to be in communication with the pneumatic room.

12 Claims, 7 Drawing Sheets

Related U.S. Application Data continuation of application No. 14/164,601, filed on Jan. 27, 2014, now Pat. No. 9,255,663, which is a continuation of application No. 13/622,025, filed on Sep. 18, 2012, now Pat. No. 8,651,315, which is a continuation of application No. 13/218,565, filed on Aug. 26, 2011, now Pat. No. 8,348,085, which is a continuation of application No. 12/289,409, filed on Oct. 28, 2008, now Pat. No. 8,033,416.

(52) U.S. Cl.

CPC .... *F17C 2209/234* (2013.01); *F17C 2221/03* (2013.01); *F17C 2221/031* (2013.01); *F17C 2223/0123* (2013.01); *F17C 2223/013* (2013.01); *F17C 2223/035* (2013.01); *F17C 2227/0192* (2013.01); *F17C 2260/02* (2013.01); *F17C 2260/035* (2013.01); *F17C 2260/036* (2013.01); *F17C 2270/01* (2013.01)

(56) References Cited

U.S. PATENT DOCUMENTS

| | | | | | |
|---|---|---|---|---|---|
| 2,020,767 | A * | 11/1935 | Bullis | A47J 36/40 138/98 |
| 2,407,076 | A | 9/1946 | Harkness | |
| 2,752,814 | A | 7/1956 | Iaia | |
| 3,035,614 | A | 5/1962 | Kirk, Jr. | |
| 3,174,658 | A * | 3/1965 | Wittenberg | B05B 9/047 222/386.5 |
| 3,452,636 | A * | 7/1969 | Cohen | F16B 43/001 403/376 |
| 6,041,820 | A | 3/2000 | Boehme | |
| 6,517,117 | B1 | 2/2003 | Lai | |
| 6,915,922 | B2 | 7/2005 | Wang | |
| 8,651,315 | B2 | 2/2014 | Wang | |
| 2005/0017016 | A1 | 1/2005 | Lombari | |
| 2005/0077204 | A1 | 4/2005 | Sumi et al. | |
| 2005/0194389 | A1 * | 9/2005 | Lai | F24D 3/1016 220/723 |

* cited by examiner

PRESSURE TANK

CROSS REFERENCE TO RELATED APPLICATION

This application is a continuation of application Ser. No. 14/984,269, filed on Dec. 30, 2015, which is a continuation of application Ser. No. 14/164,601, filed on Jan. 27, 2014, now U.S. Pat. No. 9,255,663, issued Feb. 9, 2016, which is a continuation of application Ser. No. 13/622,025, filed on Sep. 18, 2012, now U.S. Pat. No. 8,651,315, issued Feb. 18, 2014, which is a continuation of application Ser. No. 13/218,565, filed on Aug. 26, 2011, now U.S. Pat. No. 8,348,085, issued Jan. 8, 2013, which is a continuation of application Ser. No. 12/289,409, filed on Oct. 28, 2008, now U.S. Pat. No. 8,033,416, issued Oct. 11, 2011.

BACKGROUND OF INVENTION

1. Field of Invention

This invention relates to a pressure tank and more particularly to a pressure tank having two connectors for connection with pipes.

2. Related Prior Art

Taiwan Pat. No. M250911 and Taiwan Pat. No. M312357 are exemplary of patents directed to pressure tanks of the type to which this invention is directed. Basically, the conventional pressure tank includes a flexible diaphragm through which the inside of the pressure tank is divided into an upper storage space and a lower pneumatic room. However, there is only nipple with one access opening in the pressure tank to be in communication with the storage space. The only nipple is then served as both an inlet and an outlet at different time. It takes huge time simply to access liquid into or out of the storage space. Moreover, since there is only one connector for access, residue dust or dirt may be easily accumulated on the bottom of the storage space, namely on the top surface of the flexible diaphragm, after a long time use.

SUMMARY OF INVENTION

Broadly stated, the present invention is directed to a pressure tank having two through-wall connectors for access in such a way that liquid may be efficiently accessed into and out of the pressure tank. In particular, the distinctive arrangement of the through-wall connectors prevents the pressure tank from contamination accumulation.

The pressure tank includes a metallic vessel, a plastic liner, a flexible diaphragm, two through-wall connectors and a nozzle. Each of the through-wall connector includes a nipple and an anti-leak assembly. The metallic vessel includes upper and lower shells joined together. The metallic vessel defines a first planar area on the hollow cylinder of the upper shell, a second planar area on the circular plate of the upper shell and a third planar area on a bottom of the lower shell. The plastic liner is received in the upper shell of the metallic vessel. The flexible diaphragm divides the metallic vessel into a storage space and a pneumatic room. The two nipples of the connectors are mounted on the side and top of the upper shell respectively and are in communication with the storage space. The two nipples are substantially identical to each other in construction and each includes an exposed tubular portion and an inner tubular portion. The exposed tubular portion has a threaded section, a polygonal section joined to the threaded section and a cylindrical section joined to the polygonal section. The inner tubular portion is joined to the cylindrical section of the exposed tubular portion and passes through the first (or second) planar area of the upper shell and the plastic liner to be in communication with the storage space. The cylindrical section of the exposed tubular portion is weld to an exterior surface of the first (or second) planar area of the upper shell. The inner tubular portion includes a base section and a neck section extending from the base section. The neck section is riveted in order to press the plastic liner on an interior surface of the first (or second) planar area of the upper shell. The two anti-leak assemblies of the connectors provide leakproof connection between the nipples and the plastic liner.

Additionally, the nozzle is mounted on the third planar area to be in communication with the pneumatic room and also provides efficient leakproof function.

As noted above, the present invention includes at least two through-wall connectors for connection with pipes. One of the connectors may be served as an inlet and mounted on the top of the metallic vessel while the other served as an outlet and mounted on the side. And, the flexible diaphragm is located exactly between the inlet and the outlet. In this manner, any residue dust or dirt can hardly left on the flexible diaphragm and can easily be swept away from the storage space via the side outlet, and thereby contamination accumulation is avoid.

The advantages of the present invention will be understood more readily after a consideration of the drawings and the Detailed Description.

BRIEF DESCRIPTION OF DRAWINGS

The invention is illustrated by the accompanying drawings in which corresponding parts are identified by the same numerals and in which.

DETAILED DESCRIPTION OF THE PREFERRED EMBODIMENT

Figure 1:
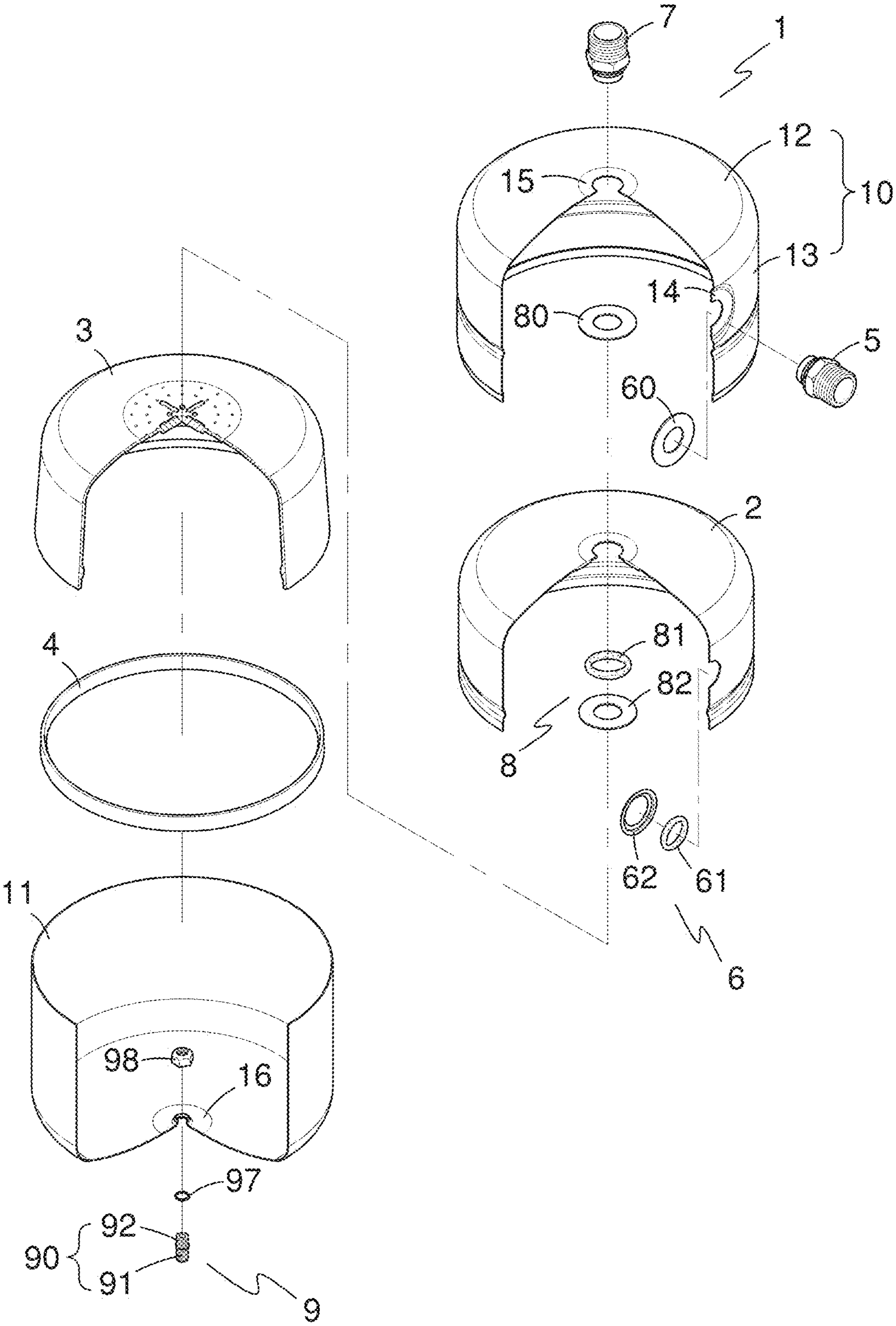
FIG. 1 is an exploded view of a pressure tank in accordance with the preferred embodiment of the invention.

Referring now to the drawings, the pressure tank according to the present invention comprises a metallic vessel 1, a plastic liner 2, a flexible diaphragm 3, a fixing ring 4, two through-wall connectors and a nozzle 9. The first through-wall connector including a first nipple 5 and a first anti-leak assembly 6; and the second through-wall connector includes a second nipple 7 and a second anti-leak assembly 8.

Figure 2:
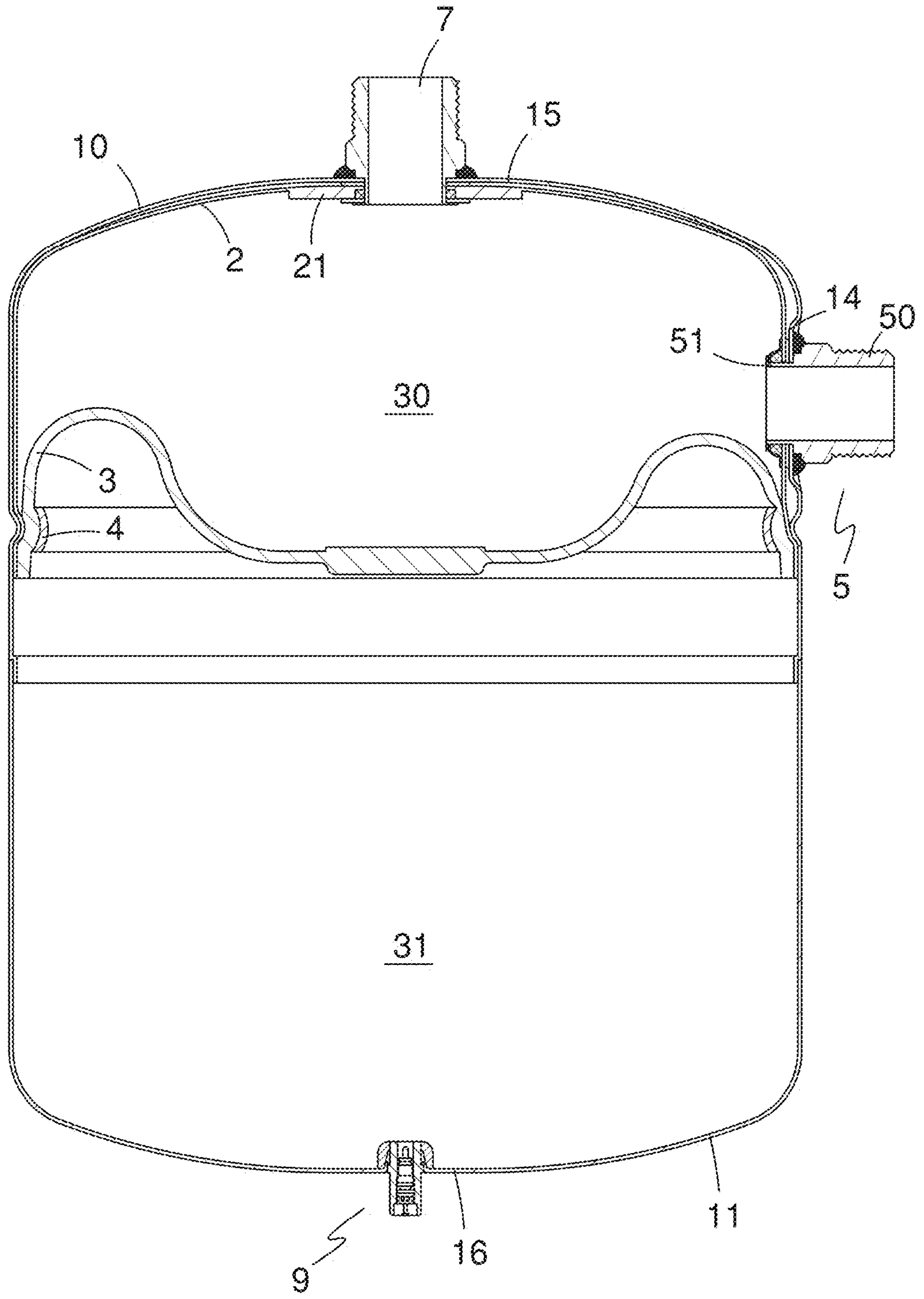
FIG. 2 is a cross section of the pressure tank of FIG. 1.
Figure 7:
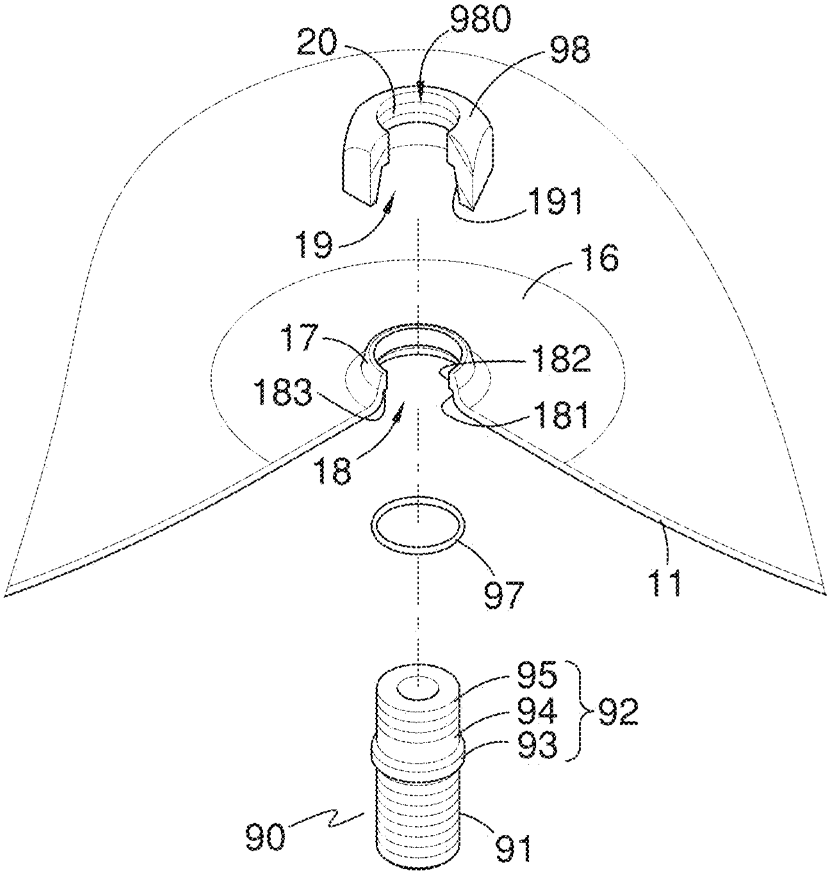
FIG. 7 is a fragmentary exploded view of the pressure tank, showing an arrangement between a nozzle assembly and a lower shell.
Figure 8:
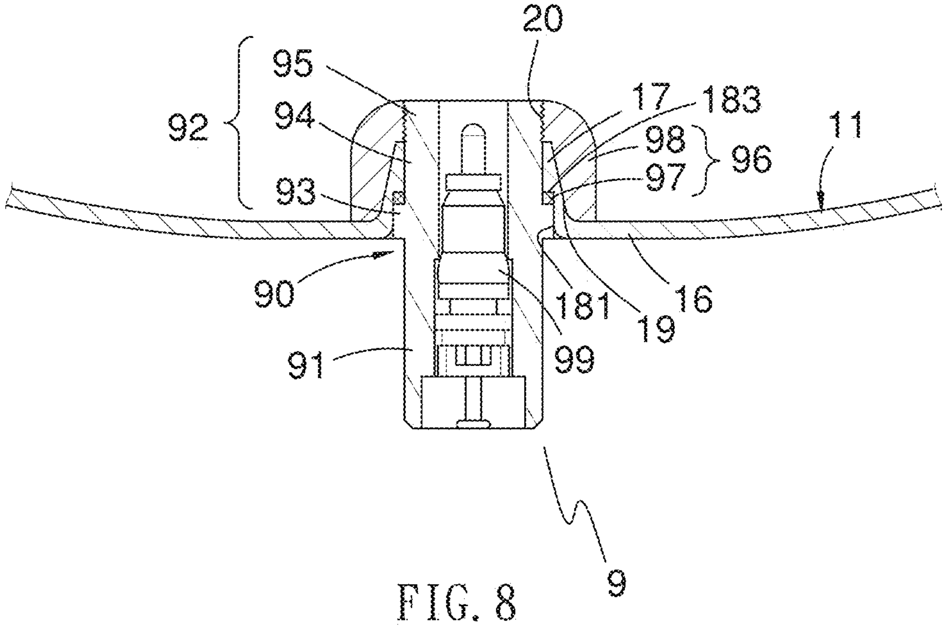
FIG. 8 is an assembled view of the parts shown in FIG. 7.

As shown in FIGS. 1 and 2, the metallic vessel 1 includes an upper shell 10 and a lower shell 11 joined together, and preferably is made of stainless steel to conform to the requirements of Food and Drug Administration (FDA). The upper shell 10 is formed of a circular plate 12 and a hollow cylinder 13 extending from the periphery of the circular plate 12. The hollow cylinder 13 defines a recessed first planar area 14, as depicted in FIG. 2. A second planar area 15 is defined in the center of the circular plate 12 of the upper shell 10. Moreover, the lower shell 11 defines a third planar area 16 thereunder and formed with an inward tubular protrusion 17 extending inwardly from the third planar area 16, as depicted in FIGS. 7 and 8. The inward tubular protrusion 17 is provided with a hole 18 including a lower hole 181 and an upper hole 182 of diameter smaller than the lower hole 181 and thereby provides a projection 183 in the hole 18. It should be noted that opposite inner and outer surfaces of each of the planar areas 14, 15, 16 are flat and even in order to be easily and firmly weld/connected with the first, second nipples 5, 7 and a third nipple 90 of the nozzle 9.

Figure 6:
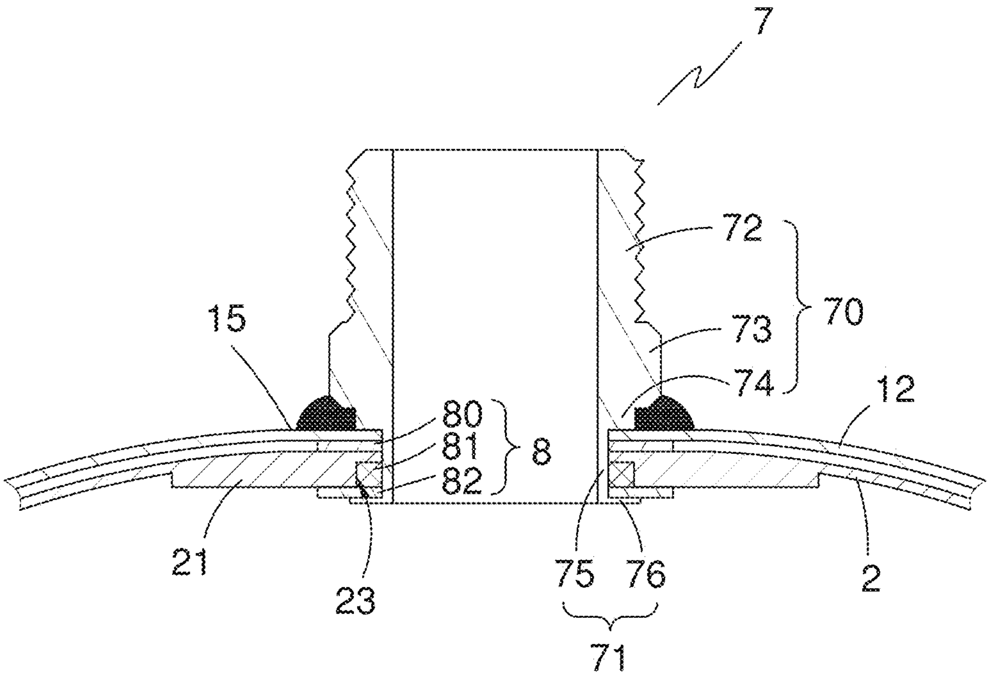
FIG. 6 is an assembled view of the parts shown in FIG. 5.

As shown in FIG. 2, the plastic liner 2 is received in the upper shell 10 and is formed with an inward protrusion 21 on a top thereof. As best seen in FIG. 6, the inward protrusion 21 of the plastic liner 2 defines an annular recession 23 therein.

Referring again to FIG. 2, the flexible diaphragm 3 is made of a rubber material and is disposed inside the plastic liner 2. The flexible diaphragm 3 and the plastic liner 2 co-define an upper storage space 30 therebetween. Likewise, the flexible diaphragm 3 and the lower shell 11 co-define a lower pneumatic room 31 therebetween. The fixing ring 4 is provided to hold the flexible diaphragm 3 against an inner peripheral wall of the plastic liner 2. Further, the flexible diaphragm 3 and the plastic liner 2 are tightly sandwiched between the fixing ring 4 and the upper shell 10 by applying rolling depression upon an exterior periphery of the upper shell 10 of the metallic vessel 1.

Figure 3:
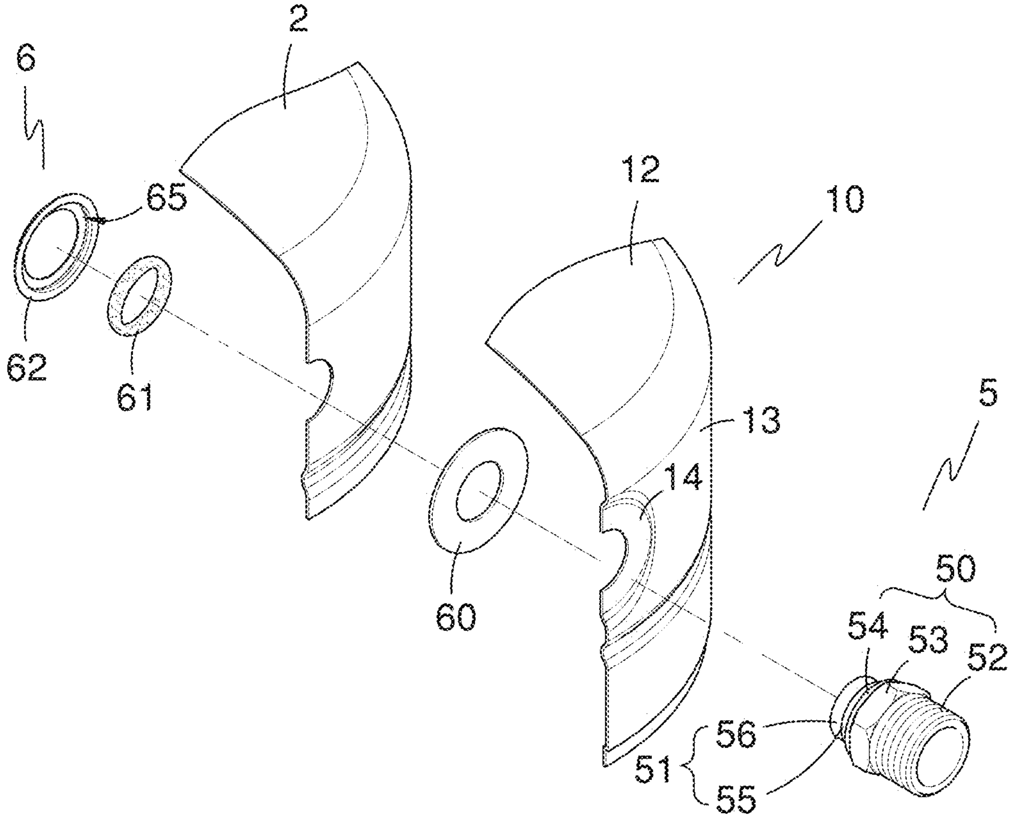
FIG. 3 is a fragmentary exploded view of the pressure tank, showing an arrangement among an upper shell and a first through-wall connector.
Figure 4:
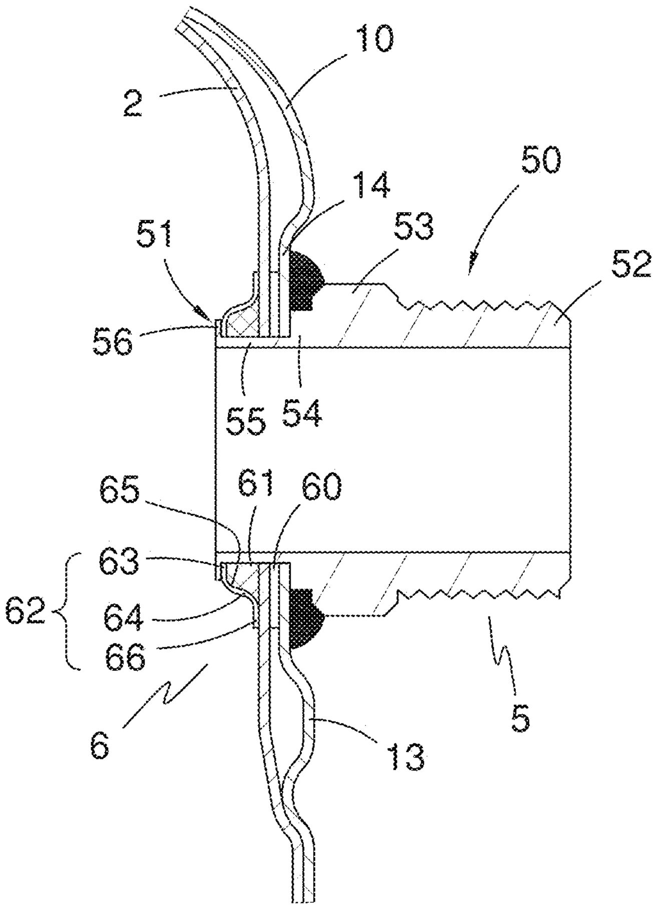
FIG. 4 is an assembled view of the parts shown in FIG. 3.

Referring to FIG. 3, the first nipple 5 of the first through-wall connector is mounted on the first planar area 14 and includes an exposed tubular portion 50 and an inner tubular portion 51. The exposed tubular portion 50 is formed with a threaded section 52, a polygonal section 53 and a cylindrical section 54. The threaded section 52 is formed with external thread for connection with a pipe (not shown). In this embodiment, the polygonal section 53 is hexagonal and extends from the threaded section 52. The cylindrical section 54 extends from the polygonal section 53 and is weld to an exterior surface of the first planar area 14 of the hollow cylinder 13 of the upper shell 10. The inner tubular portion 51 includes a base section 55 and a neck section 56. The base section 55 extends from the cylindrical section 54 of the exposed tubular portion 50. The neck section 56 extends from the base section 55. Referring to FIGS. 2 and 4, the inner tubular portion 51 passes through the first planar area 14 of the upper shell 10 and the plastic liner 2 and is in communication with the storage space 30.

Referring again to FIGS. 3 and 4, the first anti-leak assembly 6 of the first through-wall connector provides leakproof connection between the first nipple 5 and the plastic liner 2, and includes a seal washer 60, an O-ring 61 and a retainer ring 62. The seal washer 60 is placed around the inner tubular portion 51 of the first nipple 5 and placed in between the hollow cylinder 13 of the upper shell 10 and the plastic liner 2. The O-ring 61 is also placed around the inner tubular portion 51 of the first nipple 5 and is placed in between the plastic liner 2 and the retainer ring 62. As best seen in FIG. 4, the retainer ring 62 includes a ring body having a flat annular disk 63 and an inclined circumferential wall 64, and a flat ring flange 66 extending from the inclined circumferential wall 64. The flat annular disk 63 is placed around the inner tubular portion 51 of the first nipple 5. The inclined circumferential wall 64 extends outwardly from the periphery of the flat annular disk 63 and an arc connecting portion is formed between the flat annular disk 63 and the inclined circumferential wall 64 to connect the flat annular disk 63 and the inclined circumferential wall 64. The flat ring flange 66 extends and flares outward from the outer periphery of the inclined circumferential wall 64 and another arc connecting portion is formed between the inclined circumferential wall 64 and the flat ring flange 66 to connect the inclined circumferential wall 64 and the flat ring flange 66. The flat ring flange 66 has a flat surface which abuts against a planar area of an inner wall surface of the plastic liner 2. The flat annular disk 63 and the inclined circumferential wall 64 co-define an annular recession 65 for receiving the O-ring 61. It is noted that the neck section 56 of the inner tubular portion 51 is thinner than the base section 55 and is bent to hold the first anti-leak assembly 6 and the plastic liner 2 against an interior surface of the first planar area 14 of the hollow cylinder 13 of the upper shell 10. Additionally, the O-ring 61 has a thickness slightly larger than a depth of the annular recession 65 of the retainer ring 62 in such a way that the O-ring 61 can be tightly held against the planar area of the inner wall surface of the plastic liner 2 and provides a better leakproof effect.

Figure 5:
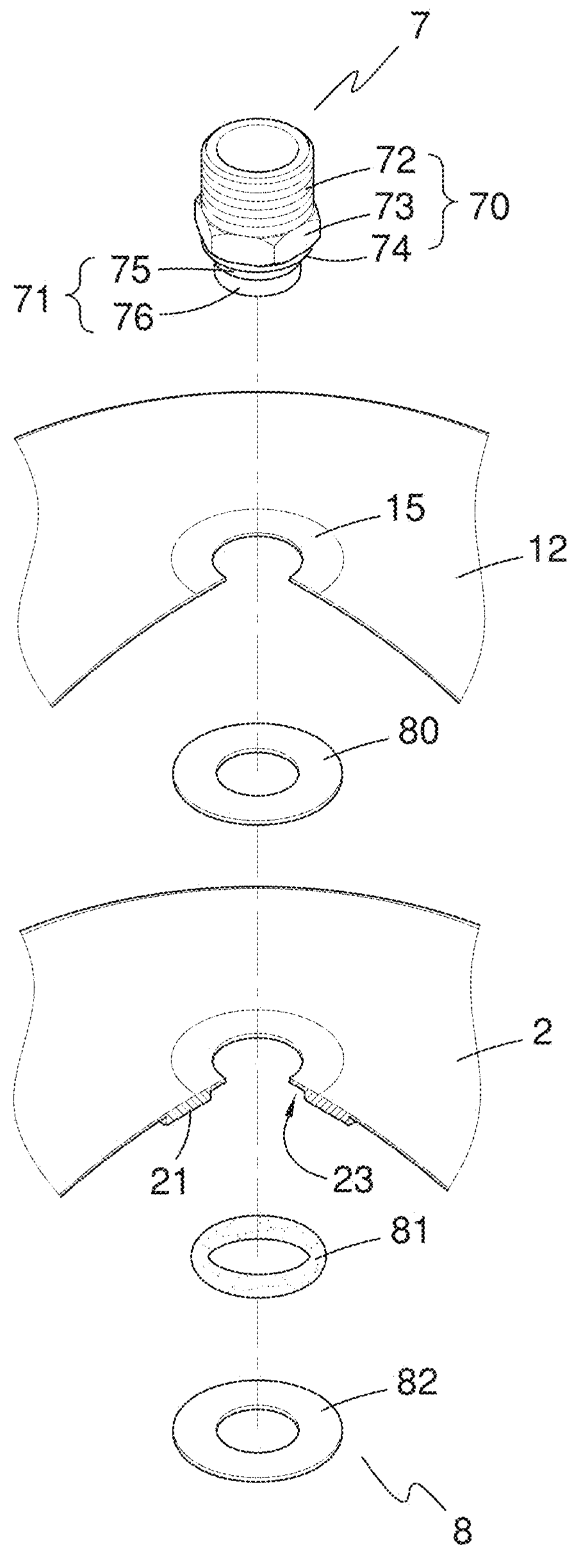
FIG. 5 is a fragmentary exploded view of the pressure tank, showing an arrangement among an upper shell and a second through-wall connector.

As shown in FIG. 5, the second nipple 7 of the second through-wall connector is substantially identical to the first nipple 5 in construction and is mounted on the second planar area 15 of the circular plate 12. Specifically, the second nipple 7 includes an exposed tubular portion 70 and an inner tubular portion 71 joined together. The exposed tubular portion 70 is formed with a threaded section 72, a polygonal section 73 joined to the threaded section 72 and a cylindrical section 74 joined to the polygonal section 73. The threaded section 72 is provided for connection with another pipe (not shown). The cylindrical section 74 of the exposed tubular portion 70 is weld to an exterior surface of the second planar area 15 of the circular plate 12 of the upper shell 10. The inner tubular portion 71 is formed with a base section 75 and a neck section 76 extending from the base section 75. Referring to FIG. 6, the inner tubular portion 71 passes through the second planar area 15 of the circular plate 12 and the inward protrusion 21 of the plastic liner 2 and is in communication with the storage space 30.

Referring back to FIG. 5, the second anti-leak assembly 8 of the second through-wall connector is placed around the inner tubular portion 71 of the second nipple 7 in order to provide a leakproof connection between the second nipple 7 and the plastic liner 2. Specifically, the second anti-leak assembly 8 includes a seal washer 80, an O-ring 81 and a retainer ring 82. The seal washer 80 is placed around the inner tubular portion 71 of the second nipple 7 and placed in between the circular plate 12 and the plastic liner 2. The O-ring 81 is also placed around the inner tubular portion 71, placed in between the inward protrusion 21 of the plastic liner 2 and the retainer ring 82, and lodged in the annular recession 23 of the inward protrusion 21 of the plastic liner 2. Likewise, the O-ring 81 has a thickness slightly larger than a depth of the annular recession 23 of the inward protrusion 21 of the plastic liner 2. As shown in FIG. 6, the neck section 76 of the inner tubular portion 71 is thinner than the base section 75 of the same and is bent to hold the second anti-leak assembly 8 and the plastic liner 2 against an interior surface of the second planar area 15 of the circular plate 12 of the upper shell 10.

Referring to FIGS. 2, 7 and 8, the nozzle 9 is mounted on the third planar area 16 of the lower shell 11 of the metallic vessel 1 and is in communication with the pneumatic room 31. Specifically, the nozzle 9 includes the third nipple 90, a third anti-leak assembly 96 and a one-way valve 99. The third nipple 90 is inserted in the hole 18 of the inner tubular protrusion 17 and has an exposed tubular portion 91 and an inner tubular portion 92. The inner tubular portion 92 has a protruding section 93, a cylindrical section 94 extending from the protruding section 93 and a threaded section 95 extending from the cylindrical section 94. The protruding section 93 of the inner tubular portion 92 is lodged in the lower hole 181 of the hole 18 of the inward tubular protrusion 17 of the lower shell 11. The inner tubular portion 92 of the third nipple 90 passes through the third planar area 16 as well as the inward tubular protrusion 17 and is in communication with the pneumatic room 31.

Moreover, the third anti-leak assembly 96 of the nozzle 9 is placed around the inner tubular portion 92 of the third nipple 90 to provide leakproof connection between the third nipple 90 and the lower shell 11. The one-way valve 99 of the nozzle 9 is received in a passage formed in the third nipple 90, through which outside air or gas can be injected into the pneumatic room 31 to drive the flexible diaphragm 3. Specifically, the third anti-leak assembly 96 includes an O-ring 97 and a connecting member 98. The O-ring 97 of the third anti-leak assembly 96 is placed around the inner tubular portion 92 of the third nipple 90. And, the O-ring 97 is lodged in the lower hole 181 of the hole 18 of the inward tubular protrusion 17 of the lower shell 11 and is sandwiched between the projection 183 of the inward tubular protrusion 17 and the protruding section 93 of the inner tubular portion 92. The connecting member 98 of the third anti-leak assembly 96 defines a through hole 980 having an screw hole 20 and a receiving hole 19 for receiving the third nipple 90 and the inward tubular protrusion 17 of the lower shell 11. The screw hole 20 of the through hole 980 of the connecting member 98 is adapted for engaging the threaded section 95 of the inner tubular portion 92 of the third nipple 90, and thus a surface of the connecting member 98 abuts against an end face of the inner tubular protrusion 17 of the lower shell 11. The receiving hole 19 of the through hole 980 of the connecting member 98 includes an annular groove 191 defined in an inner peripheral wall surface of the connecting member 98 for reception of the inner tubular protrusion 17 of the lower shell 11. In particular, the receiving hole 19 of the through hole 980 of the connecting member is tapered in diameter from outside to inside of the lower shell 11, and the inner tubular protrusion 17 of the lower shell 11 is mated with the annular groove 191 of the receiving hole 19 of the through hole 980 of the connecting member 98. In such a way, the inner tubular protrusion 17 can be snugly wedged into the connecting member 98. In such a fashion, the nozzle 9 can be easily assembled and provides excellent leakproof function.

From the forgoing description, the present invention includes at least two connectors to connect with pipes. One of two connectors may serve as an inlet and the other as outlet for water or liquid so as to prevent the upper surface of the flexible diaphragm from accumulation of residue dust or dirt.

It will be appreciated that although a particular embodiment of the invention has been shown and described, modifications may be made. It is intended in the claims to cover such modifications which come within the spirit and scope of the invention.

The invention claimed is:

1. A pressure tank, comprising:

a metallic vessel having an upper shell and a lower shell joined together, wherein the lower shell has a depression and a hole passing through the depression;

a plastic liner enclosed by the metallic vessel and received in the upper shell of the metallic vessel;

a flexible diaphragm disposed inside the plastic liner, wherein the flexible diaphragm and the plastic liner co-define an upper storage space therebetween, the flexible diaphragm and the lower shell co-define a lower pneumatic room therebetween;

a fixing ring provided to hold the flexible diaphragm against an inner peripheral wall of the plastic liner; and a nozzle mounted on the lower shell of the metallic vessel and being in communication with the lower pneumatic room, wherein the nozzle including:

a nipple having a first end inside the lower pneumatic room of the lower shell, a second end exposed on the outside of the lower shell, a protruding section protruding from an outer wall of the nipple and between the first and second end of the nipple, and an outer thread section formed on the first end of the nipple and passing through the hole of the lower shell into the lower pneumatic room;

a connecting member, inside the lower pneumatic room, engaging with the nipple by engagement of the outer thread section of the nipple with a screw hole of the connecting member; and an O-ring being placed around the nipple and being sandwiched between the depression of the lower shell and the protruding section of the nipple.

2. The pressure tank of claim 1, wherein the connecting member further comprises an upper portion, the upper portion having a top surface and a bottom surface opposite to the top surface; the screw hole is formed in the upper portion.

3. The pressure tank of claim 2, wherein the connecting member further comprises an annular under portion extending downward from the bottom surface of the upper portion, the annular under portion has a receiving hole in communication with the screw hole thereof, a bottom surface of the annular under portion presses against the lower shell of the metallic vessel.

4. The pressure tank of claim 3, wherein a ring wall is formed between the receiving hole and the screw hole; the ring wall is facing the O-ring.

5. The pressure tank of claim 3, wherein the diameter of the receiving hole is greater than the diameter of the screw hole.

6. The pressure tank of claim 1 wherein the nozzle further comprises a one-way valve received in a passage formed in the nipple.

7. The pressure tank of claim 2 wherein the nozzle further comprises a one-way valve received in a passage formed in the nipple.

8. The pressure tank of claim 3 wherein the nozzle further comprises a one-way valve received in a passage formed in the nipple.

9. The pressure tank of claim 4 wherein the nozzle further comprises a one-way valve received in a passage formed in the nipple.

10. The pressure tank of claim 5 wherein the nozzle further comprises a one-way valve received in a passage formed in the nipple.

11. The pressure tank of claim 1, wherein the depression of the lower shell has a second surface opposite to the first surface, the protruding section of the nipple abuts against the first surface of the depression and the connecting member abuts against the second surface of the depression.

12. The pressure tank of claim 11, wherein the nozzle further comprises a one-way valve received in a passage formed in the nipple.

* * * * *